United States Patent [19]

Hiros et al.

[11] Patent Number: 4,682,265
[45] Date of Patent: Jul. 21, 1987

[54] IONISATOR FOR VEHICLES

[75] Inventors: László Hiros; Gábor Banati; Ervin Lipscher, all of Budapest, Hungary

[73] Assignee: Medicor Muyek, Budapest, Hungary

[21] Appl. No.: 755,181

[22] Filed: Jun. 14, 1985

[63] Continuation of PCT HU85/00031, filed May 21, 1985, published as WO85/05598, Dec. 19, 1985.

[30] Foreign Application Priority Data

May 30, 1984 [HU] Hungary ............... 2108/84

[51] Int. Cl.⁴ ............... B60H 3/00; H01T 23/00
[52] U.S. Cl. ............... 361/231; 98/2.11
[58] Field of Search ............... 361/231, 212, 216–218; 55/101, 103, 128, 149, 152, 102, 276, 279; 98/2.11; 422/121

[56] References Cited

U.S. PATENT DOCUMENTS 2,290,376  7/1942  Marshall ............... 361/231 X
4,227,446 10/1980  Sone et al. ............... 98/2.11

Primary Examiner—L. T. Hix
Assistant Examiner—D. Rutledge
Attorney, Agent, or Firm—Handal & Morofsky

[57] ABSTRACT

The invention relates to a housing for a vehicle ionisator which has a flat longitudinal body (1) and on both sides of which a pair of ionisator armatures (2, 3) are provided and jointedly coupled with the body. The ionisator armatures (2, 3) are pivotable about an oblique axis. On the body (1) openings (4, 5) are provided which enable the mounting of the vehicle ionisator on the inside rearview mirror of the vehicle. For securing serve securing clips projecting out of the front plate (6) of the body and which embrace the frame of the rearview mirror (18) from the backside.

5 Claims, 4 Drawing Figures

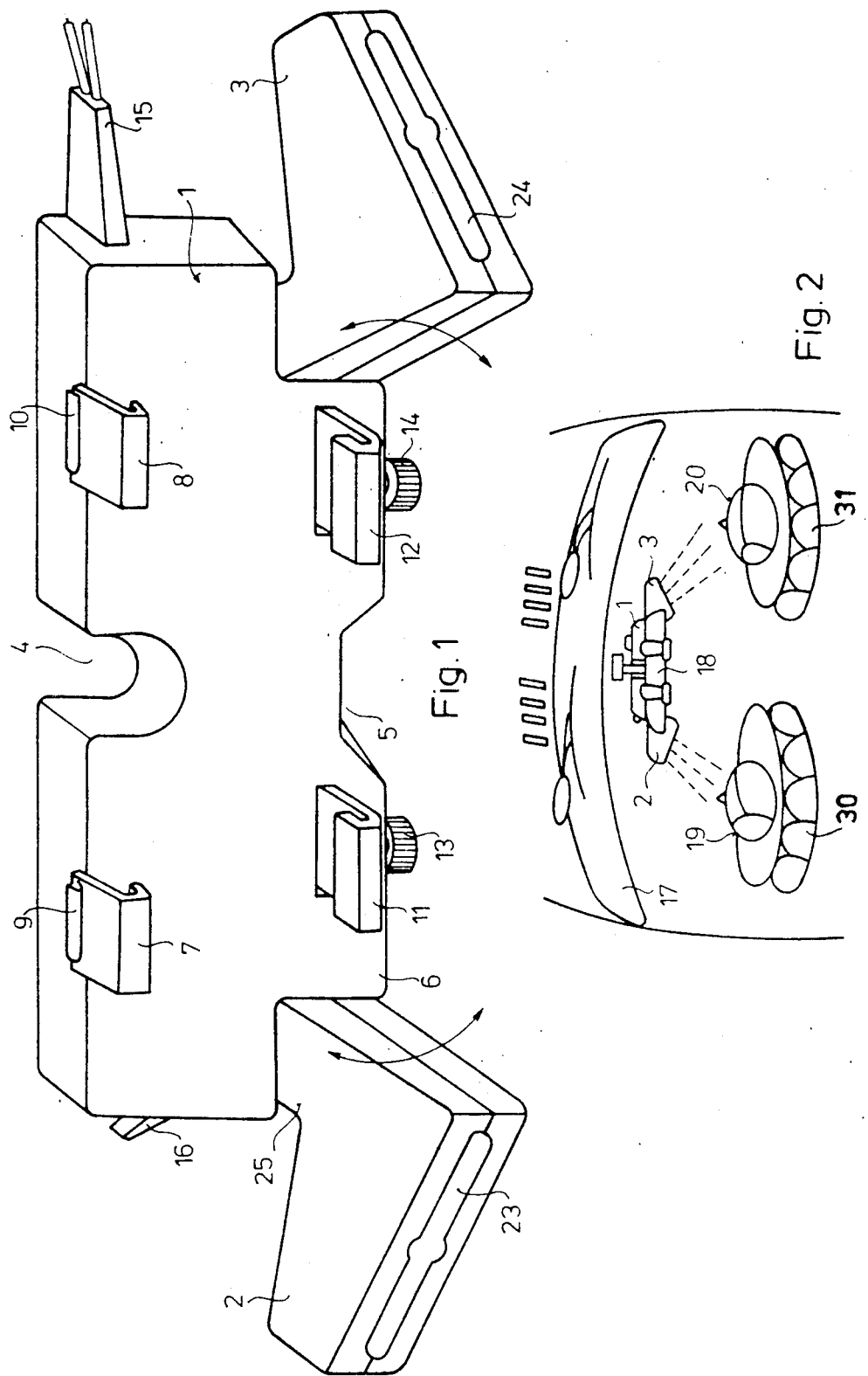

IONISATOR FOR VEHICLES

FIELD AND BACKGROUND OF THE INVENTION

The invention relates to a motor vehicle ionisator which comprises a body which can be fixed into the inner space of the motor vehicle and an ionisator armature which is coupled to such body.

In motor vehicles, in order to assure a general well feeling of the passengers, and in order to prevent the sleep inducing effect of long distance automobile trips, frequently ionizators are provided which are supplied from the d.c. source of the motor vehicle with current. The auto ionisators usually are mounted on the body work next to the windshield, in some types of automobiles they are mounted on the dashboard. The mounting of the vehicle ionisators on a desirable place usually is carried out without the necessary skill, and the ionisator frequently presents a disturbing interference with the view of the driver.

A type of mounting which provides a sufficient ion concentration for the driver, is in general not capable also to ionize sufficiently the space for the passengers, that is, such auto ionisators are practically comfortable only for one person. The ionisator armature producing the negative ions is in general rigidly coupled with the ionisator body comprising also the circuits necessary for the production of the high voltage and, it follows that an adjustably directed ion field cannot be produced.

SUMMARY OF THE INVENTION

It is an object of the present invention to provide a motor vehicle ionisator, for a vehicle which is capable of providing an effective and adjustable ionisation effect for both the driver and a passenger sitting next to the driver, and the mounting of which does not require special skills.

Such object will be solved within the scope of the invention in that the ionisator body comprises a flat longitudinal shape which fits very well behind the inside rearview mirror. On such body on both sides there are provided an ionisator armature having a jointed coupling. When making the jointed coupling, a pivot axis which lies obliquely with respect to the front plate of the body is selected and, as a result, the beam direction can be varied within a desired angular range.

For securing on the inside rearview mirror, there are provided several members coupled with the body, preferrably fixable with screws, and projecting supporting clips, and for the upper securing, supporting clips are provided which are coupled with the body by means of an elastic strap.

For the purpose of an appropriate form-fitting onto the backside of the rearview mirror, in the middle of the body on the upper and lower side, there is an opening (a recess) provided, which receives the element serving for the mounting of the mirror.

In order that the ionisator armatures would cover less of the view and could be adjusted simple, it is preferred that they are in the form of bodies which are flat and outwardly tapering and, on the front side provided with a slit and provided with a shaft projecting backward at an acute angle with respect to the frontal surface. From the shaft portion projects in a side direction a securing member which forms the sole jointed coupling and, the axis of which is disposed vertically with respect to the side surface of the shaft.

In order to make the best use of the available space, it is preferred, when in region of both lower corners of the body, rectangular recesses are provided for receiving the shafts of the ionisator armatures. One of the side surfaces of the recesses forms an acute angle with the front face and includes in its inside the second part of the jointed coupling, a nest, the axis of which is directed vertically with respect to the side surface.

The motor vehicle ionisator according to the invention can be mounted easily behind the back of the inside rearview mirror of the motor vehicle, and with the both adjustable ionisator armatures, the driver, as well as the passengers may indpendently adjust the optimum direction of the ion field for their individual comfort and, the flat ionisator armatures will not interfere with the view at all.

BRIEF DESCRIPTION OF THE DRAWINGS

The motor vehicle ionisator according to the invention will be described in the following, on hand of an embodiment thereof, with reference to the drawings.

FIG. 1 illustrates the motor vehicle ionisator according to the invention in a perspective view from front;

FIG. 2 illustrates the inner space of the motor vehicle with the ionisator mounted on the rearview mirror, on top view;

DESCRIPTION OF THE PREFERRED EMBODIMENT

Figure 3:
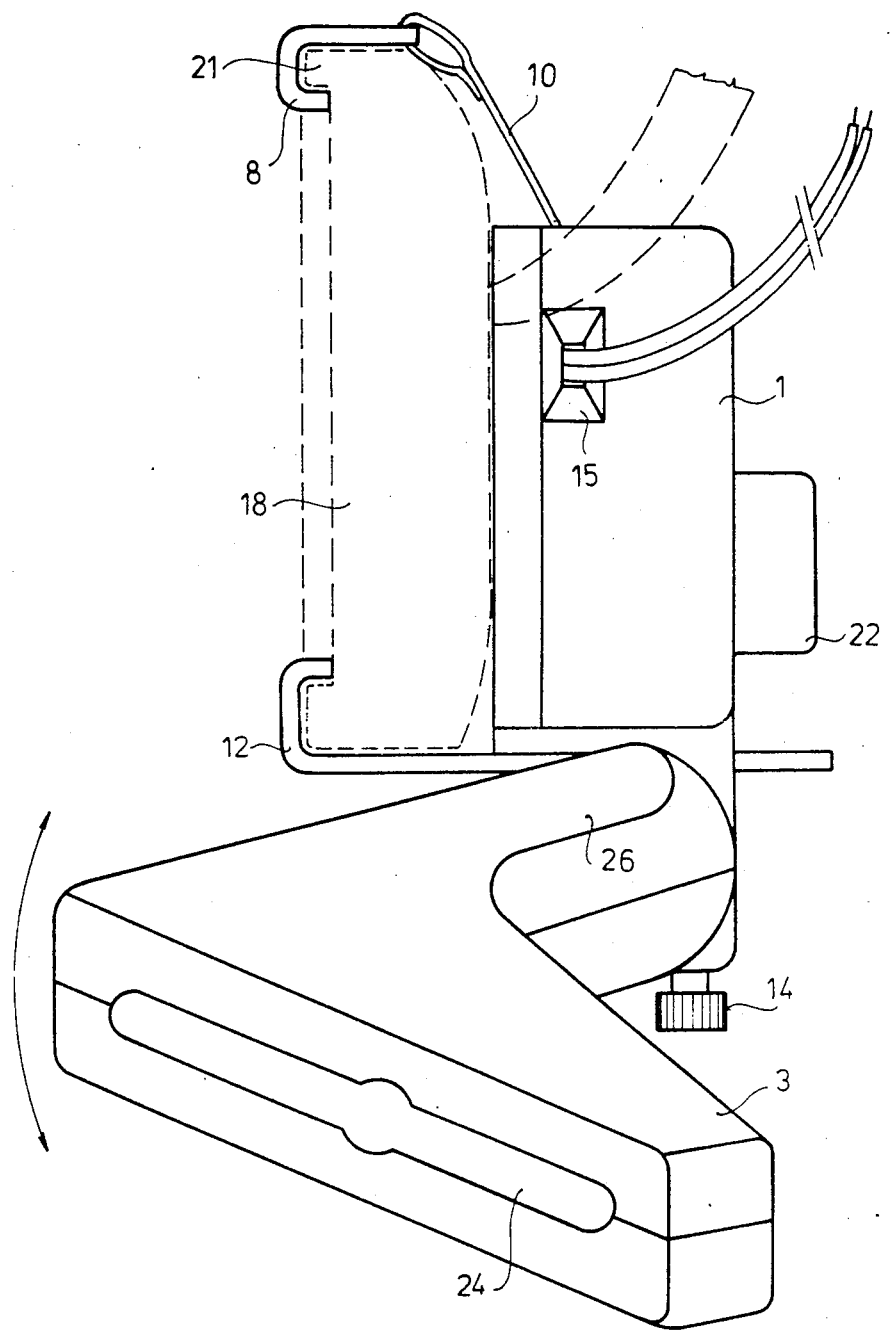
FIG. 3 illustrates the motor vehicle ionisator according to the invention in an enlarged and side view.

In FIG. 1 the motor vehicle ionisator according to the invention is illustrated in a perspective view. It can be seen that the motor vehicle ionisator comprises three main parts, namely a body 1 and two ionisator armatures 2 and 3 which are coupled and formed in a mirror-symmetrical fashion with the body. Body 1 is flat and symmetrical in shape, in its middle region on its upper and lower part a opening 4 and an opening 5, respectively, is provided. From a front plate 6 of body 1, securing clips 7 and 8 are projecting on the upper part, which by means of elastic straps 9, 10 are secured to the inside of the body 1. On the lower part similarly securing clips 11 and 12 are provided, the flat end portions of which are vertically directed to the front plate 6 of the body 1 and project thereinto. Their position can be fixed by means of screws 13, 14.

By means of a coupling 15 on the right side of the body 1, a supply voltage is connected and, on the left side a switch 16 is provided with which the ionistor can be turned on or off.

According to the invention, the inventive motor vehicle ionisator is mounted on the inside rearview mirror of the vehicle. FIG. 2 illustrates in a schematic fashion the inside of the vehicle viewed from above, showing the right and left seats 30 and 31, the windshield 17 and the rearview mirror 18. The body 1 is mounted on the rearview mirror 18 and, only the ionisator armatures 2 and 3 project over the plane of the mirror and, can be adjusted by the driver 19 and the passenger 20 according to their desire.

FIG. 3 illustrates an enlarged picture projected in the direction of the arrow A in FIG. 2 and, which illustrates the mounting of the ionisator on the inside rearview mirror 18, which in most vehicle types is provided with a circumferential frame 21. With the help of the screws 13 and 14 the projecting length of the securing clips 11 and 12 can be set in such a fashion, that the clips will embrace the frame 21. This will assure a simultaneous rigid support for the ionisator. The upper securing clips 7, 8 are secured with the help of straps 9, 10 onto the upper frame 21, the strength of securing will be assured by the elastic tensioning force of the straps 9, 10. The middle securing element of the rearview mirror will fit into the opening 4, while an eventual lower, middle projection will be received by the opening 5. A cylinder shaped projection 22 which can be seen on the backside of the body 1 will serve for the receiving of the high voltage transformer. This cylinder cannot be seen from the seats. The inside rearview mirror 18 will cover completely the ionisator with the exception of the ionisator armatures 2 and 3.

The shape of the ionisator armatures 2 and 3 can be very well seen in the figures: they are flat in shape and have a front surface provided with slits 23, respectively 24, and a surface forming with the front surface an acute angle and including on each side a shaft 25, respectively 26, and a backside running obliquely with respect to the front surface.

Figure 4:
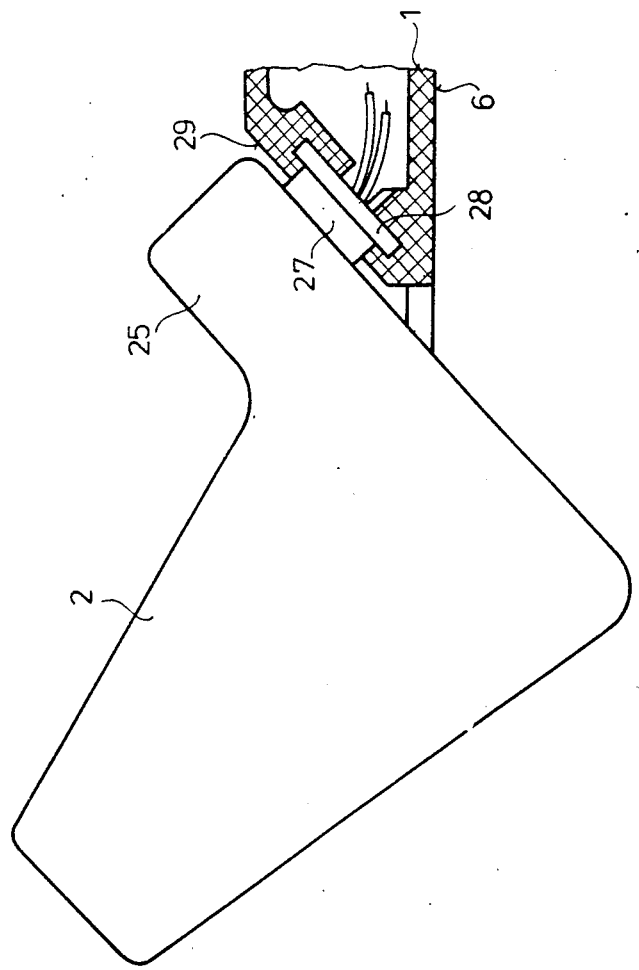
FIG. 4 is the coupling between the ionisator armature and the body illustrated in a schematic fashion, partially in section.

FIG. 4 illustrates the jointed coupling between the body 1 and the ionisator armature 2. From the shaft 25 of the ionisator armature 2 projects, vertically with respect thereto, a securing member 27, which fits exactly into an appropriately formed nest 28 of the body 1. A side surface 29 of the body 1 encloses with the front plate 6 in the region of the nest 28 an acute angle. In this fashion the ionisator armature 2 can be pivoted by means of the above-described jointed coupling with respect to body 1 about the indicated axis. The pivotability is indicated in FIG. 1 by means of the arrows.

Body 1 is preferably made from two parts. In this case the oblique side surface 29 makes it difficult to insert the securing member 27. The securing member 27 can be inserted only in a completely defined angular positioning of the ionisator armature 2. Once the securing member 27 is inserted, it will hold both parts of the body together.

Through the inside of the securing member 27 a bore is made for the conductors which connect the switch and circuits in the body 1 with the ionisator armature 2.

In the ionisator armature 2 the ionizing needle electrode is mounted behind the middle portion of the slit 23. The pivoting of the ionisator armatures 2 and 3 of the rearview mirror mounted ionisator makes it possible that the driver 19 and the passenger 20 can select independently from each other a beam direction to suit their individual comfort. In addition to such very valuable possibility, it is still a further advantage that the vehicle ionisator of the invention can be mounted in a very desirable manner without interferring with the view.

We claim:

1. A housing for a vehicle ionisator comprising a body fixable within the inner space of the motor vehicle and ionisator armatures coupled thereto said body being a flat longitudinal body (1), on both sides of which an ionisator armature (2, 3) is formed in a mirror-symmetrical fashion, a jointed coupling having an oblique axis with respect to a front plate (6) of the body (1) for coupling each of said armatures to said body in an adjustable fashion, and wherein the body (1) comprises fixing elements.

2. Ionisator housing for vehicles according to claim 1, characterized in that in the middle region of the body (1) at least on one side an opening (4, 5) is formed.

3. Ionisator housing for vehicles according to claim 1, characterized in that the ionisator armatures (2,3) are formed as flat, outwardly tapering bodies provided on their front side with a slit (23, 24) and including a shaft forming an acute angle with respect to the front side and directed backward (25, 26) and, from the shaft (25, 26) in the side direction a member of the jointed coupling in the form of a securing member (27) is projecting, the axis of which is vertical with respect to the side surface of the shaft.

4. Ionisator housing for vehicles according to claim 3, characterized in that in the region of both lower corners of the body (1) corner recesses are formed for receiving the shaft (25, 26) of the ionisator armatures (2, 3) and one side surface (29) of the recess forms an acute angle with a front plate (6) and in its inside comprises a nest (28) forming the second member of the jointed coupling, the axis of which is directed vertically to the side surface (29).

5. Ionisator housing for vehicles according to claim 1, characterized in that the fixing elements are in the form of securing clips (11, 12) on the lower part of the body (1) projecting vertically with respect to the front plate (6) and, having a free length adjustable by means of screws (13, 14), and furthermore on the upper part of the body they are in the form of securing clips (7, 8) projecting outwardly and being secured by means of elastic straps (9, 10) on the inside of the body.

* * * * *